United States Patent [19]

Mikami

[11] 4,442,910

[45] Apr. 17, 1984

[54] COMBINATORIAL WEIGHING APPARATUS

[75] Inventor: Yoshiharu Mikami, Kyoto, Japan

[73] Assignee: Kabushiki Kaisha Ishida Koki Seisakusho, Kyoto, Japan

[21] Appl. No.: 368,915

[22] Filed: Apr. 16, 1982

[30] Foreign Application Priority Data

Apr. 23, 1981 [JP] Japan .............................. 56-59322[U]

[51] Int. Cl.³ .................... G01G 19/22; G01G 19/00; B65G 25/04
[52] U.S. Cl. .................................... 177/25; 177/145; 198/429; 198/747
[58] Field of Search ............................ 177/25, 70, 145; 198/429, 747

[56] References Cited

U.S. PATENT DOCUMENTS 3,407,916 10/1968 Engeler ............................ 198/429 X
4,141,442 2/1979 Cole et al. ............................ 198/429
4,206,822 6/1980 Mazzucchelli .................... 177/70 X
4,285,412 8/1981 Wirth .................................. 177/179

Primary Examiner—George H. Miller, Jr.

[57] ABSTRACT

Disclosed is a combinatorial weighing apparatus for combining weight values of articles to-be-weighed respectively placed on a plurality of juxtaposed weighing machines, selecting a combination of the articles having a weight equal or closest to a target weight and delivering the selected articles. Such combinatorial weighing apparatus comprises pushing members which can move frontward and backward on respective bowls of the plurality of juxtaposed weighing machines, a driver unit which selectively moves the pushing members frontward and backward, these pushing members corresponding to the weighing machines with the selected batches of the articles placed thereon, and a conveyor which is disposed along the juxtaposed weighing machines and which conveys the batches delivered by the pushing members.

8 Claims, 4 Drawing Figures

COMBINATORIAL WEIGHING APPARATUS

BACKGROUND OF THE INVENTION

This invention relates to a combinatorial weighing apparatus. More particularly, it relates to a combinatorial weighing apparatus which is supplied manually with articles of various weights unsuited for automatic feed, which apparatus measures the weights of the respective articles and combines the measured weight values into a predetermined weight.

An automatic weighing apparatus based on a combination computing system (referred to as a "combinatorial weighing apparatus") includes a plurality of weighing machines. It operates by measuring the weights of articles automatically fed to the respective weighing machines, adding the actually measured weight values in each of an arbitrary or predetermined number of different combinations, comparing each resulting sum with a predetermined target weight, and selecting the combination whose weight sum is equal or closest to the target weight. In such combinatorial weighing apparatus, the distributive supply of the articles to the respective weighing machines, the computation for obtaining the best combination, the delivery of the articles belonging to the best combination, etc. are fully automatic. The apparatus can weigh the articles with great accuracy in a short period of time, and is especially suited to the combinatorial weighing of bulky articles such as vegetables, fruits and confectioneries.

Some kinds of articles, however, are not suitable for distributive supply. They are, for example, articles which have large volumes, articles which are likely to be damaged when supplied automatically and distributively, and articles which are viscous and poorly distributed. It has therefore been impossible to apply the known fully-automatic combinatorial weighing apparatus to the combinatorial weighing of such articles.

BRIEF SUMMARY OF THE INVENTION

It is accordingly an object of this invention to provide a combinatorial weighing apparatus which is capable of the combinatorial weighing of articles unsuited for distributive supply and which is compact in size.

Another object of this invention is to provide a semiautomatic combinatorial weighing apparatus which, merely by putting articles on weighing machines, can perform combinatorial weighing automatically, deliver the articles belonging to the best combination and carry the delivered articles to a predetermined location via a conveyor.

Still another object of this invention is to provide an automatic delivery device and a weighing machine which are suitable for use in a semiautomatic combinatorial weighing apparatus.

Other features and advantages of the invention will be apparent from the following description taken in conjunction with the accompanying drawings.

DESCRIPTION OF THE PREFERRED EMBODIMENTS

Figure 1:
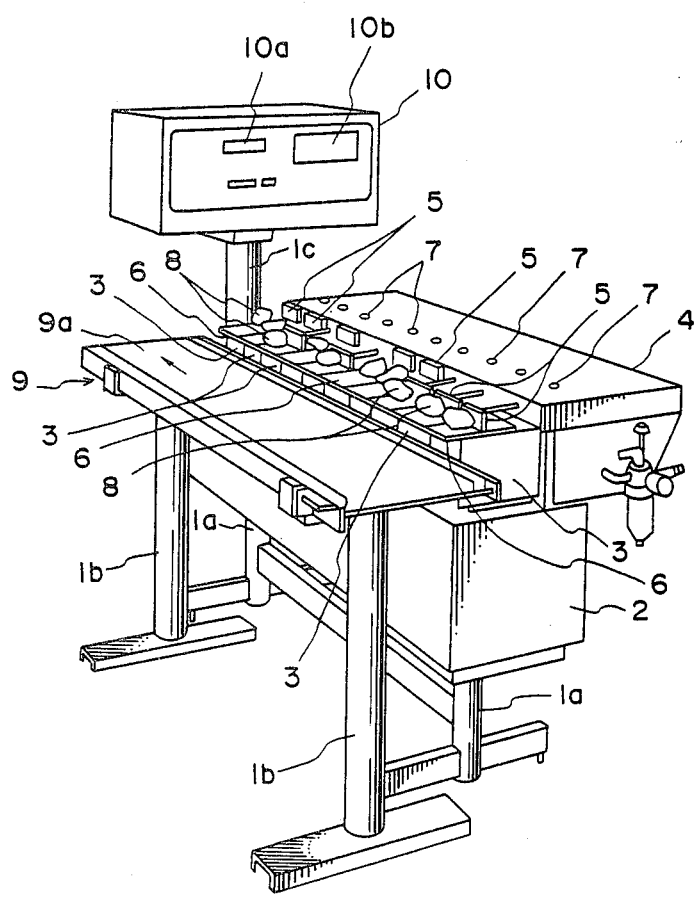
FIG. 1 is a perspective view of a combinatorial weighing apparatus according to this invention.

Referring to FIG. 1, a bed 2 is supported by legs 1a. On the bed 2, a plurality of weighing machines 3 are juxtaposed, and a housing 4 is mounted. Pushing members 5, 5 . . . are disposed in correspondence with the respective weighing machines 3, 3 . . . in a manner to retractably advance from a side surface of the housing 4. The pushing members 5, 5 . . . can move frontward and backward on bowls 6, 6 . . . of the corresponding weighing machines 3, 3 . . . . As will be described later, a driving mechanism for selectively advancing and retracting the pushing members 5, 5 . . . is disposed in the housing 4. On the top of the housing 4, selection indicating lamps 7, 7 . . . are mounted in correspondence with the respective weighing machines. The selection indicating lamps 7,7 . . . indicate the weighing machines 3, 3 . . . on which articles 8, 8 . . . belonging to the best combination are placed.

Mounted on legs 1b and 1b is a delivery conveyor holder 9, on which an endless conveyor 9a is disposed in a manner to be movable in the direction of the arrow. The plurality of weighing machines 3, 3 . . . mentioned above are juxtaposed in the moving direction of the conveyor 9a. The level of the conveyor 9a is somewhat lower than that of the bowls 6, 6 . . . .

A control box 10 is turnably supported on a leg 1c. The control box 10 includes a switch portion 10a for setting the data of a target weight value etc,. a display portion 10b for indicating various data, and so forth.

In the weighing apparatus, when the aritcles 8, 8 . . . are placed on the bowls 6, 6 . . . manually, the weighing machines 3, 3 . . . measure the weights of the respective batches of the articles. A combination computing unit, not shown, selects the best combination, namely the combination nearest the target weight, based on the weight values of the respective batches. The pushing members 5, 5 . . . corresponding to the weighing machines 3, 3 . . . on which the articles 8, 8 . . . belonging to the best combination are placed, are advanced. Owing to the advancing operation of the pushing members 5, 5 . . . , the particular batches of the articles 8, 8 . . . fall onto the conveyor 9a. They are conveyed in the direction of the arrow, and are gathered into a pool hopper or the like (not shown). The pushing members 5 are normally held retracted, and the selectively advanced ones are retracted after a predetermined time.

Figure 2:
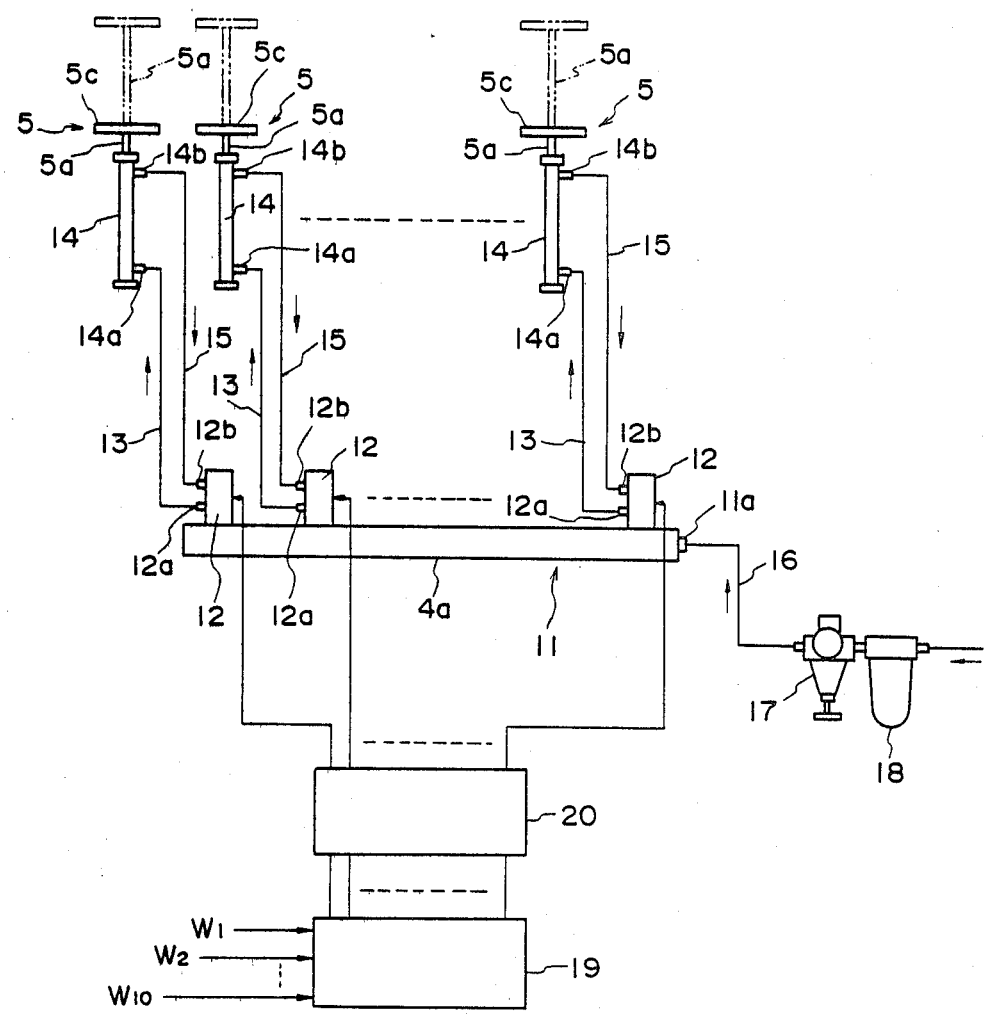
FIG. 2 is a schematic view of a mechanism for driving pushing members for use in the combinatorial weighing apparatus of FIG. 1.

FIG. 2 is a view for explaining a mechanism for driving the pushing members. Electromagnetic valves 12, 12 . . . of a number equal to the number of the juxtaposed weighing machines 3, 3 . . . are fixed at equal intervals longitudinally of an air circulating tube 11. Each electromagnetic valve 12 has ports 12a and 12b. The respective ports 12a are connected through pipes 13, 13 . . . to ports 14a, 14a . . . of air cylinders 14, 14 . . . which are disposed in correspondence with the weighing machines 3, 3 . . . , while the respective ports 12b are connected through pipes 15, 15 . . . to ports 14b, 14b . . . of the air cylinders 14, 14 . . . . Although not shown in the figure, a piston is disposed in each cylinder 14. This piston has one end of a piston rod 5a of the pushing member 5 attached thereto, and a plate 5c is secured to the other end of the piston rod 5a. A regulator 17 and an air filter 18 are serially connected to a port 11a of the air circulating tube 11 through a pipe 16.

When a combination control unit 19 is supplied with the weight values $w_1, w_2, \ldots,$ and $w_{10}$ of the articles 8, 8 . . . from the respective weighing machines 3, 3 . . . , it performs a combination computation and provides signals indicative of the best combination. On the basis of the best combination signals, an electromagnetic valve driver circuit 20 energizes the electromagnetic valves 12, 12 . . . corresponding to the weighing machines 3, 3 . . . on which the selected batches of the articles are placed. Thus, air is fed into the air cylinders 14, 14 . . . through their ports 14a, 14a . . . via the ports 12a, 12a . . . of the energized magnet valves 12, 12 . . . , to move the pistons upwardly as viewed in the figure and to advance the pushing members 5, 5 . . . . Owing to the advance of the pushing members 5, 5 . . . , the articles 8, 8 . . . placed on the bowls 6, 6 . . . are delivered onto the conveyor 9a. After the electromagnetic valves 12, 12 . . . have been energized for the predetermined time, they are deenergized. Then, the air enters the air cylinders 14, 14 . . . through the ports 12b, 12b . . . , pipes 15, 15 . . . and ports 14b, 14b . . . , to move the pistons downwardly and to retract the pushing members 5, 5 . . . to their initial positions.

Figure 3:
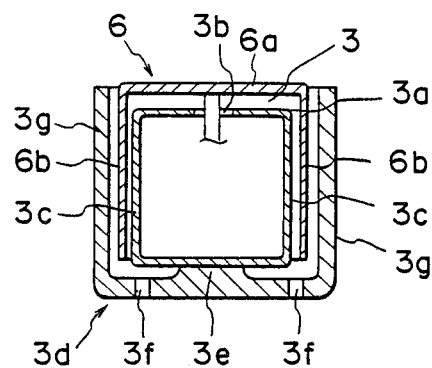
FIG. 3 is a sectional view of a weighing machine for use in the combinatorial weighing apparatus of FIG. 1.
Figure 4:
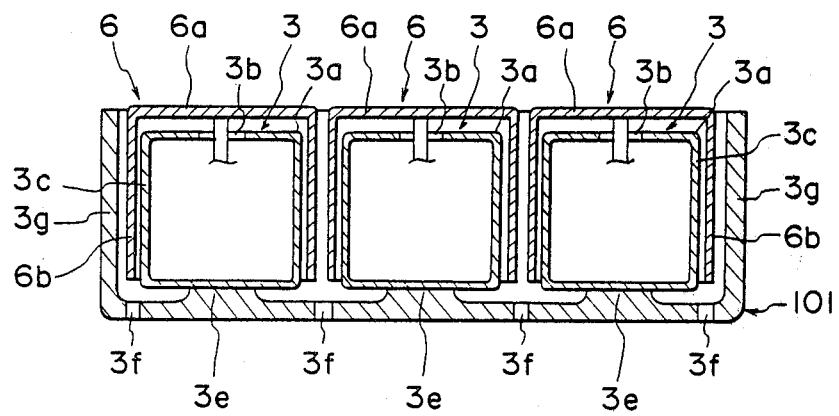
FIG. 4 is a sectional view of another weighing machine.

FIGS. 3 and 4 are sectional views of weighing machines.

Referring to FIG. 3, the weighing machines 3 which contains a suitable detection mechanism such as load cell is formed with an opening 3b in a predetermined part of the top of a frame 3a thereof. The weighing bowl 6 has a structure in which depending portions 6b and 6b are provided on the periphery of a bowl portion 6a. The bowl thus is open downward. The bowl 6 is so supported as to be fitted in the weighing machine 3, and the peripheral sides 3c and 3c of the frame 3a are covered by the depending portions 6b and 6b of the bowl. Symbol 3d indicates a mounting member which has a protuberance 3e centrally of its bottom wall and drip holes 3f around the protuberance and which is provided with a peripheral wall 3g rising at its periphery. The weighing machine 3 on which the bowl 6 has been mounted, is fitted into the mounting member 3d and is fixed to the protuberance 3e in such a manner that the suspended portions 6b of the bowl 6 are surrounded by the peripheral wall 3g.

In the weighing machine of FIG. 4, the bottom wall of a mounting member 101 having a predetermined length is formed with a plurality of protuberances 3e at equal intervals. A plurality of weighing machines 3 are mounted and fixed onto the respective protuberances 3e in parallel. An upstanding peripheral wall 3g formed on the periphery of the mounting member 101 surrounds the outer surfaces of the depending portions 6b of the respective bowls 6. In FIG. 4, the same parts as in FIG. 3 are assigned the same symbols.

According to the weighing machines shown in FIG. 3 and 4, even in such a case where the bowls 6 are washed with water, the invasion of the water into the weighing machine bodies can be reliably prevented. Moreover, any weighing error ascribable to the contact of anything other than the article to-be-weighed with the bowl 6 can be prevented.

Described next will be a weighing operation with the weighing apparatus according to this invention.

First, a power switch, not shown, is closed, and various data such as the number of selection and the target weight of the articles 8 are set by means of the control box 10. Therefore, an operator places the articles 8 on the respective bowls 6 manually and closes a start switch disposed on the control box 10. Then, the weight values $w_1, w_2 \ldots$ and $w_{10}$ of the respective batches of the articles 8 placed on the bowls 6 are applied to the control unit 19 (refer to FIG. 2). Here, they are combined and added, and the combination to which the preset number of batches belong and which exhibits the target weight value or an approximate value thereof is selected. Thus, the indicating lamps 7, 7 . . . corresponding to the selected batches are turned on, while at the same time the electromagnetic values 12, 12 . . . corresponding to the weighing machines 3, 3 . . . on which the selected batches are placed are energized by the electromagnetic valve driver circuit 20. Upon the energization of the electromagnetic valves, the corresponding air cylinders 14, 14 . . . are actuated to advance the pushing members 5, 5 . . . , so that the batches 8 on the bowls 6 are pushed out onto the conveyor 9a. The batches 8 pushed out are transferred to the next station by the delivery conveyor 9a, whereas the batches 8 on the unselected bowls 6 are held intact on these bowls 6. When the advanced pushing members 5, 5 . . . have been moved back to their original positions after the predetermined period of time, the articles 8 are again placed on the empty bowls 6 manually. When the start switch is subsequently closed, the weight values of the respective batches of the articles 8 are combined and added again by the combination control unit. The batches 8 selected are pushed out onto the delivery conveyor 9a as in the foregoing step. Thenceforth, the articles are weighed according to the same procedure.

Since the apparatus of this invention is semiautomatic as described above, it is suited for weighing a commodity of a large volume, a commodity susceptible to damage, etc. into a target weight. Moreover, since the apparatus is designed to be compact, it can be simply fabricated by an already-installed job line. Further, since the apparatus adopts the system of combining and selecting measured weight values, the variation in the weights of the individual articles does not affect the precision of weighing.

What we claim is:

1. A combinatorial weighing apparatus for combining weight values of articles not suitable for distributive supply respectively manually placed, selecting a combination of the articles having weight equal or closest to a target weight and delivering the selected articles, said apparatus comprising:

a plurality of juxtaposed closely spaced weighing machines each having a bowl for receiving the manually placed articles;

pushing members which can move frontward and backward on the respective closely spaced bowls of the plurality of juxtaposed weighing machines;

a driving unit which selectively moves the pushing members frontward and backward, said pushing members corresponding to the weighing machines with selected batches of the articles placed thereon, said driving unit comprising:

electromagnetic valves, air cylinders coupled to said valves and having piston rods attached to said pushing members which are respectively disposed in correspondence with said weighing machines; and a driver circuit which drives the electromagnetic valves corresponding to said weighing machines with said selected batches placed thereon, and selected ones of said electromagnetic valves are energized, thereby to extend and contract the piston rods connected to said air cylinders and to move said pushing members frontward and backward; and a conveyor which is disposed along the juxtaposed weighing machines and which conveys said batches of the articles delivered by said pushing members.

2. A combinatorial weighing apparatus according to claim 1, further comprising a control box which serves to set the target weight.

3. A combinatorial weighing apparatus according to claim 1,
wherein each said weighing machine comprises:
said bowl whose periphery is formed with a depending portion;
a body which contains a weight detecting mechanism; and
a concave mounting member which extends upward and which has a peripheral wall, and
wherein said bowl is supported on said body, a peripheral side of said body is covered with said depending portion, said body is mounted and fixed on said mounting member, and said depending portion of said bowl is surrounded by said peripheral wall of said mounting member.

4. A combinatorial weighing apparatus according to claim 3, wherein the weight detecting mechanism is attached to said bowl through an opening in the top of said body.

5. A combinatorial weighing apparatus according to claim 4, wherein said peripheral wall of said mounting member is closely spaced to said depending portion of said bowl.

6. A combinatorial weighing apparatus according to claim 1,
wherein each said weighing machine comprises:
a plurality of said bowls each of which is formed with a depending portion in its periphery;
a plurality of body portions each of which contains a weight detecting mechanism; and
a mounting member which has a peripheral wall and which has a plurality of protuberances on its bottom part, and
wherein the respective bowls are supported on the corresponding body portions, peripheral sides of said body portions are covered by the depending portions, said body portions are mounted on the corresponding protuberances of said mounting member, and respective depending portions of the respective bowls are surrounded by said peripheral wall of said mounting member.

7. A combinatorial weighing apparatus according to claim 6, wherein each weight detecting mechanism is attached to a respective bowl through an opening in the top of a respective body.

8. A combinatorial weighing apparatus according to claim 7, wherein said peripheral wall of said mounting member is closely spaced to the respective depending portions of said bowls.

* * * * *

UNITED STATES PATENT AND TRADEMARK OFFICE
CERTIFICATE OF CORRECTION

PATENT NO. : 4,442,910
DATED : April 17, 1984
INVENTOR(S) : Yoshihara Mikami

It is certified that error appears in the above-identified patent and that said Letters Patent is hereby corrected as shown below:

Front page, after "Primary Examiner-George H. Miller, Jr.", insert
--Attorney, Agent, or Firm-Staas & Halsey--.

Column 3, line 58, "FIG." should be --FIGS.--.

Signed and Sealed this

Twentieth Day of November 1984

[SEAL]

Attest:

GERALD J. MOSSINGHOFF

Attesting Officer

Commissioner of Patents and Trademarks